United States Patent
Ghantous et al.

(10) Patent No.: US 8,823,751 B2
(45) Date of Patent: Sep. 2, 2014

(54) SIZE BASED DISPLAY OF PIPING SYSTEMS

(75) Inventors: Sami Ghantous, Manchester, NH (US); Thord Backe, Hopkinton, NH (US); Bo Noren, Boras (SE)

(73) Assignee: AUTODESK, Inc., San Rafael, CA (US)

( * ) Notice: Subject to any disclaimer, the term of this patent is extended or adjusted under 35 U.S.C. 154(b) by 924 days.

(21) Appl. No.: 11/340,123

(22) Filed: Jan. 26, 2006

(65) Prior Publication Data

US 2007/0186149 A1    Aug. 9, 2007

(51) Int. Cl.
*G06T 19/20* (2011.01)
*G06F 17/50* (2006.01)

(52) U.S. Cl.
USPC ............................. 345/666; 345/630; 703/1

(58) Field of Classification Search
CPC .................. G06T 2219/2024; G06T 2210/36; G06T 19/20
USPC ...................... 345/630, 666; 703/1
See application file for complete search history.

(56) References Cited

U.S. PATENT DOCUMENTS

| | | |
|---|---|---|
| 5,062,068 A | 10/1991 | Kondo et al. |
| 5,260,883 A | 11/1993 | Wilson |
| 5,517,428 A | 5/1996 | Williams |
| 5,740,341 A | 4/1998 | Oota et al. |
| 5,768,149 A | 6/1998 | Umney et al. |
| 5,805,171 A * | 9/1998 | St. Clair et al. ............... 345/619 |
| 6,041,171 A | 3/2000 | Blaisdell et al. |
| 6,151,680 A | 11/2000 | Kim et al. |
| 6,236,409 B1 * | 5/2001 | Hartman ...................... 345/629 |
| 6,405,156 B1 | 6/2002 | Kern et al. |
| 6,718,215 B2 | 4/2004 | Friedrich et al. |
| 6,757,576 B2 | 6/2004 | Greer et al. |
| 6,778,871 B2 | 8/2004 | Holman et al. |
| 7,065,476 B2 * | 6/2006 | Dessureault et al. ............. 703/2 |
| 2003/0061011 A1 | 3/2003 | Hoeft |
| 2003/0200062 A1 | 10/2003 | Dessureault et al. |
| 2004/0128116 A1 | 7/2004 | Normann et al. |
| 2005/0004782 A1 | 1/2005 | Frankel et al. |
| 2005/0172260 A1 | 8/2005 | Eichstaedt et al. |

FOREIGN PATENT DOCUMENTS

| | | |
|---|---|---|
| JP | 9062721 | 3/1997 |
| JP | 9330441 | 12/1997 |

* cited by examiner

*Primary Examiner* — Jeffery A Brier
(74) *Attorney, Agent, or Firm* — Patterson & Sheridan, LLP (57) ABSTRACT

Embodiments of the invention provide a technique for rendering components included in a computer-aided design (CAD) drawing of a utility network, such as system of pipes and related equipment. Display settings may specify whether a particular component should be rendered using 2-line, 1-line or graphical 1-line display representations, based on the size of that component in the CAD drawing.

21 Claims, 7 Drawing Sheets

SIZE BASED DISPLAY OF PIPING SYSTEMS

BACKGROUND OF THE INVENTION

1. Field of the Invention

The present invention generally relates to computer software. More specifically, the present invention relates to software used to create a computer model of a utility network system.

2. Description of the Related Art

The term computer-aided design (CAD) generally refers to a broad variety of computer-based tools used by architects, engineers, and other construction and design professionals. CAD applications may be used to construct computer models representing virtually any real-world construct. Commonly, CAD applications are used to generate computer models and drawings related to utility networks. For example, a CAD application may be used to compose a model of a connected system of pipes, electrical, or HVAC ductwork components. The models may be used to create a variety of two-dimensional (2D) and three-dimensional (3D) views of the utility network. Additionally, such models may be used to generate construction, engineering, and other documentation related to the utility network such as bills of materials, requirements, etc.

Currently, CAD applications may be configured to display drawing components in a CAD drawing using different levels of detail. For example, a model of a large diameter pipe connected to a boiler system will typically be designed and specified in great detail (actual pipe runs, joining elements, dimensions, etc.), while a small copper water line may only be modeled with enough detail to provide general routing specifications. Two drawing representations for a pipe network include 1-line and 2-line display representations. Drawing all components as "2-line" representations (2-line means to draw the pipe using two lines representing the actual diameter of the pipe) tends to clutter up the drawing and can cause confusion when trying to read the drawing. For this reason users may draw some pipe networks using "1-line" representations (1-line is a single line representation showing the actual length of the piping, the actual diameter is only known by labeling the pipe with the size). The decision to represent a using component using a 2-line or 1-line display representation is typically a matter of user discretion where the user must expressly select which components should be rendered using full 3D elements or 2-line display representations and which should be rendered using 1-line representations when constructing the CAD drawing. One drawback of this approach is that if the display representation of an element in a CAD drawing needs to be changed, the user must manually delete the elements from the CAD drawing and replace it with an element that uses the desired display representation. The process of deleting and replacing CAD elements is both tedious and time consuming and often results in mistakes and confusion when drafting the CAD drawing.

Accordingly, there is a need for a CAD application that allows users to compose a CAD drawing of a utility network that is selectively rendered using multiple display representations within the same CAD drawing, and that further allows the display representation for at least some selected components to change, without requiring the user to redraft the complete CAD drawing.

SUMMARY OF THE INVENTION

Embodiments of the invention render a display of a CAD drawing using 2-line, 1-line or graphical 1-line display representations of the various components included in the CAD drawing. Typically, the display representation selected for a component is related to an attribute of the component, such as the size of a pipe's diameter. However, other attributes may be used. For example, related components may be grouped together as part of a particular pipe system. Display settings may specify which systems in a CAD drawing to display using 2-line, 1-line, or graphical 1-line display representations.

One embodiment of the invention includes a method for generating a CAD drawing of a utility network. The method generally includes the steps of receiving a command to add a component to the CAD drawing, selecting a display representation to use in rendering a display of the component in the CAD drawing, wherein the display representation is a 2-line, a 1-line, or a graphical 1-line display representation, and rendering the display of the component using the selected display representation.

2-line representations are used to convey the actual physical size, shape, and geometry of a particular component in drawing. 1-line representations are used to convey the end-to-end dimensions and size of a particular component, but do not convey the actual physical shape of the component. Graphical 1-line representations are used to convey a generalized routing of a system without including specific details about the location, fittings or joints of the component. Additionally, valves and other inline components are represented using symbols displayed at easily readable size.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a computer-aided design (CAD) application allowing users to compose and view CAD drawings of a utility network, such as a system of pipes and related components. The components of the utility network may be rendered using a combination of 2-line, 1-line, or graphical 1-line display representations. Typically, the display representation is selected using an attribute of the component, such as the diameter of a pipe represented by the component.

As described herein, the 2-line representation displays the component at a scale reflecting the real-world physical dimensions, shape and size of the component relative to others in the CAD drawing. Thus, the 2-line display representation of an 8" diameter pipe would be rendered having twice the size of a 4" diameter pipe. The name "2-line" refers to the representation of the component in a two-dimensional (2D) drawing, where the diameter a pipe is shown using two parallel lines. "2-line" also refers to dimensionally accurate display representations used for equipment components (e.g., pumps, tanks and the like) connected to the pipe system. The scale, size, and position of equipment components may need to be very precise to allow large, expensive, or difficult to move components to be accurately represented in a CAD drawing. Thus, large diameter pipes and other components may rendered to scale in a CAD drawing using a 2-line display to help ensure that they are installed exactly as shown in the CAD drawing.

As the name suggests, the 1-line representation is used to render a display of a pipe component using a single line. Pipe components rendered using 1-line display representations are displayed using a single line that shows the accurate position and length of the pipe component in a CAD drawing. At the same time, fittings, joints, valves, and other inline components are rendered to scale and the 1-line display representation maintains the correct end-to-end dimensionality of the component. 1-line display representations are useful because a CAD drawing with multiple, closely-positioned 2-line renderings may be difficult to interpret, which may contribute to errors in installing the pipe system represented in the CAD drawing. Thus, representing pipe components using the 1-line display representation keeps the CAD drawing simple and readable, but still conveys the correct pipe routing and inline equipment rendered to scale.

The graphical 1-line representation allows the user to specify a generalized routing of a pipe system without including specific details about the location of a pipe component, fittings, or joining methods. Valves and other inline components are represented as symbols not drawn to scale, and the size of the symbol representing an inline component is not related to the physical size of the component. Instead, symbols are displayed using an easily readable size. For incidental or non-critical branches of a pipe system, the graphical 1-line display representations allows a CAD drawing to convey a general routing of the pipe system and to show what inline components are part of the routing, without requiring the user to specify the precise position and geometry of the components included in the routing. When the pipe system is installed, the correct components are routed as generally indicated in the drawing.

To facilitate a description of the invention, the following discussion describes an embodiment of a CAD application used to model a system of branching and interconnected pipe components. Accordingly, aspects of the invention are described in reference to a pipe system that includes components such as pipes, tees, elbow joints, pumps, tanks, reducers etc. However, the invention is not limited to use in modeling a pipe system and may readily be adapted to allow users to compose and view CAD drawings of other utility networks such as electrical networks, communications networks, or HVAC networks.

Figure 1:
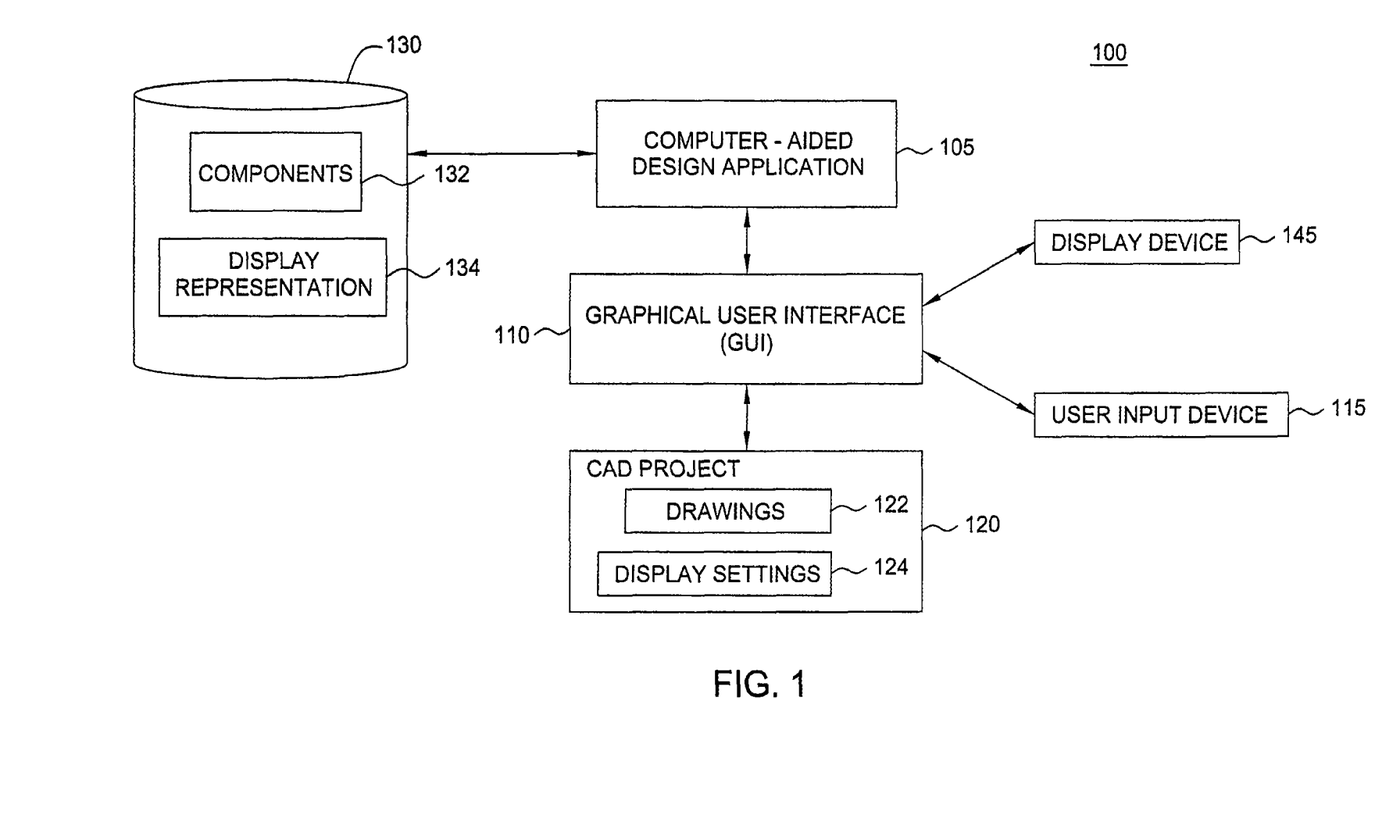
FIG. 1 is a block diagram illustrating components of a CAD environment, according to one embodiment of the invention.

FIG. 1 is a block diagram illustrating components of a CAD environment, according to one embodiment of the invention. As shown, the CAD environment 100 includes, without limitation, a CAD application 105, a graphical user interface (GUI Interface) 110, a CAD project 120, a user input device 115, a display device 145, and a drawing components catalog 130.

In one embodiment, the CAD application 105 provides a computer program that allows users to create, edit, and view the drawings 122 associated with CAD project 120. For a CAD project 120 related to the architecture, engineering, or design of a pipe system, the Autodesk® Building System program suite available from Autodesk, Inc. may be used. The GUI interface 110 provides elements (e.g. menus, buttons, dropdowm lists, check-boxes, etc.) that allow a user to compose and view CAD drawings 122. Input devices 125 allow a user to interact with CAD drawings 122 and GUI interface 110. User input devices 115 typically include a pointing device and a keyboard but may also include other devices such as drawing tablets, touch screens, and the like. Display device 115 provides users with a visual representation the CAD drawings 122 on a CRT or LCD monitor.

In one embodiment of the present invention, a computer-readable storage medium stores instructions for generating a computer-aided design (CAD) drawing of a utility network by receiving a command to add a component of the CAD drawing, selecting a display representation to use in rendering a display of the component in the CAD drawing based on a comparison result of a configurable threshold value and an attribute of the component of the CAD drawing, where the configurable threshold value and the attribute are based on a same unit of measurement, and rendering the display of the component of the CAD drawing using the selected display representation.

CAD project 120 includes the collection of drawings, drawing templates, models, images, 2D and 3D views, etc. (collectively referenced as drawings 122), associated with a particular CAD project 120. The CAD project 120 includes data specifying the components included in drawings 122 along with the topology (i.e., the spatial location, orientation, and size) of the components. Display settings 124 allow a user to define how displays of drawings 122 are rendered or displayed to the User. More specifically, display settings 124 allow the user to specify how the CAD application 105 determines whether a particular component should be rendered using a 1-line, 2-line, or graphical 1-line display representation. The rendering of drawings 122 may be part of a display presented on display device 145 or part of documentation generated from the drawings 122, such as construction or engineering documentation that provides a two- or three-dimensional view of drawings 122. Drawing components catalog 130 provides the collection of components 132 that a user may select to include in a particular drawing 122. For a pipe system, drawing catalog 130 includes components 132 to represent pipes, valves, tie-ins, tees, elbows, reducers, etc. Display representations 134 provide the 1-line, 2-line, and graphical 1-line display representations used render a visual display of components 132.

The CAD environment 100 illustrated in FIG. 1 may include software applications and associated data files configured for existing computer systems, e.g., desktop computers, server computers, laptop computers, tablet computers, and the like. The components illustrated in CAD environment 100, however, are not limited to any particular computing environment, programming language, or computer hardware and/or software combination, and embodiments of the invention may be adapted to take advantage of new computing systems as they become available. Additionally, the components illustrated in FIG. 1 may be deployed on individual computer systems or on distributed systems configured to communicate over computer networks ranging from small local area networks to large wide area networks such as the Internet. For example, CAD application 105 may be a server component executing on one computer system in communication with a GUI interface 110 executing on another computer system.

Figure 2:
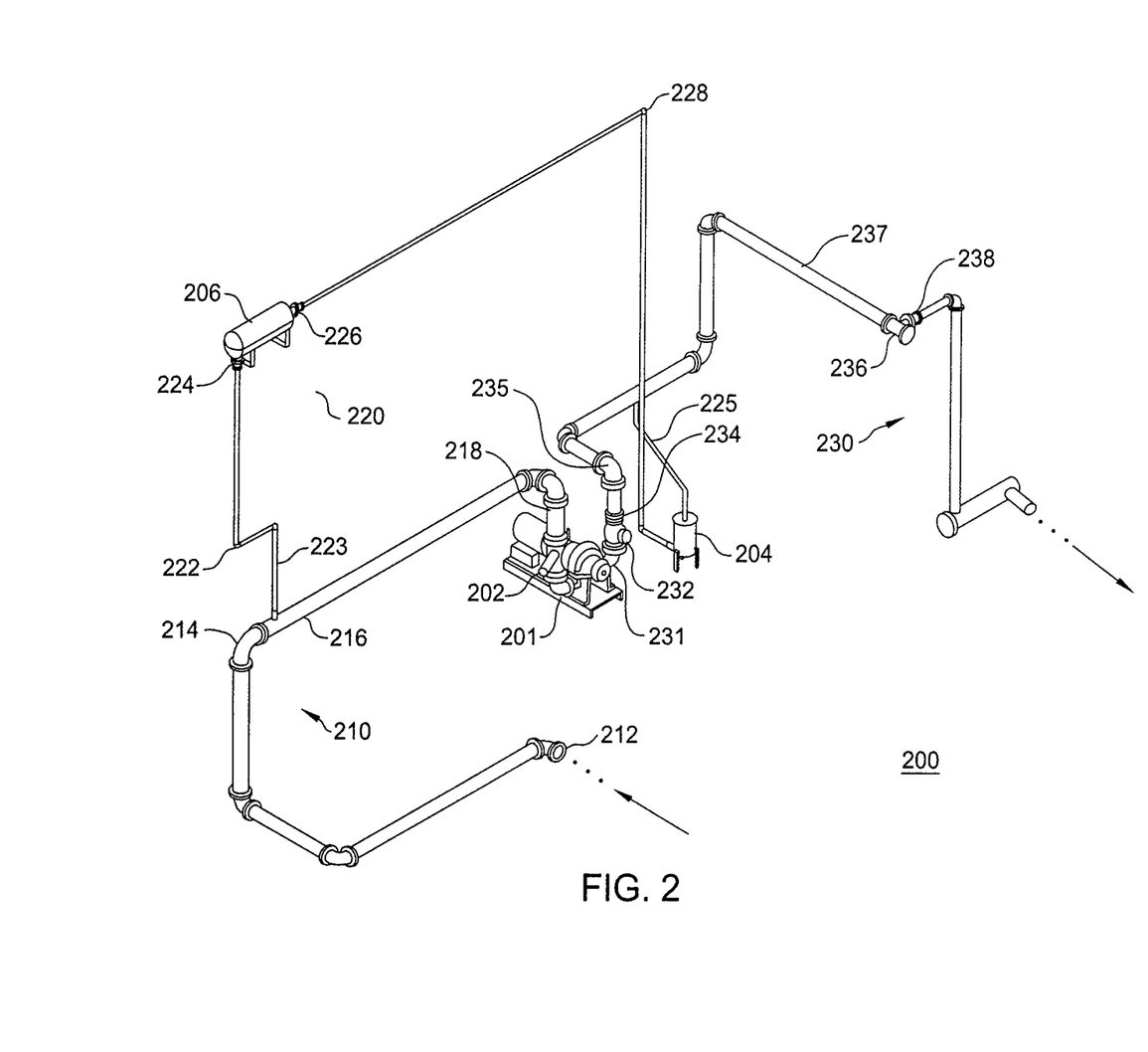
FIG. 2 is an isometric view of a pipe system, according to one embodiment of the invention.

FIG. 2 is an isometric view of a pipe system 200, according to one embodiment of the invention. In this example, pipe system 200 is rendered as a drawing 122 in the CAD environment 100 of FIG. 1. Each of the components in pipe system 200 is represented using a 2-line display representation. Thus, the components included in pipe system 200 are displayed using display representations that reflect their actual physical shape and dimensions, relative to one another.

As shown, pipe system 200 includes three general pipe runs 210, 220 and 230. A first pipe run 210 begins with pipe segment 212 and is ultimately routed to an inlet 202 on pump 201. First pipe run 210 includes several components, including an elbow 214 and pipe segments 214, 216 and 218. Assume for this example that the components 132 of pipe run 210 represent components specified to have a 13" diameter. Leading from an outlet 231 of pump 201 is pipe run 230 that includes a connector 232 and valve 234. Further down, pipe run 230 includes a pipe segment 235 connected to a tee 236 and a reducer 238. Assume for this example that the components of pipe run 220 represent components specified to have an 11" diameter. Finally, pipe run 220 includes an incidental system that includes connecting tanks 206 and 204 and pipe segments 223 and 225 connecting pipe runs 220 into pipe runs 210 and 230, as shown. Assume for this example that the components of pipe run 230 represent components specified to have a 1" diameter.

While accurate, exclusively using 2-line display representations for the components makes it difficult to interpret which components are, in fact, included in pipe run 220. For example, the inline components 224 and 226 may represent valves positioned on either side of tank 206. However, given the scaled size used to display a rendering of pipe system 200, the 2-line display representations of components 224 and 226 appear as little more than bulges in pipe run 220. Similarly, the specific size and shape of elbow joints 222 and 228 are difficult to discern. As described in greater detail herein, embodiments of the invention provide a technique for rendering pipe system 200 that includes using 2-line, 1-line, and graphical 1-line display representations. These representations are used to render the individual components of pipe system 200, based on the size of each component and the display settings associated with pipe system 200.

Figure 3:
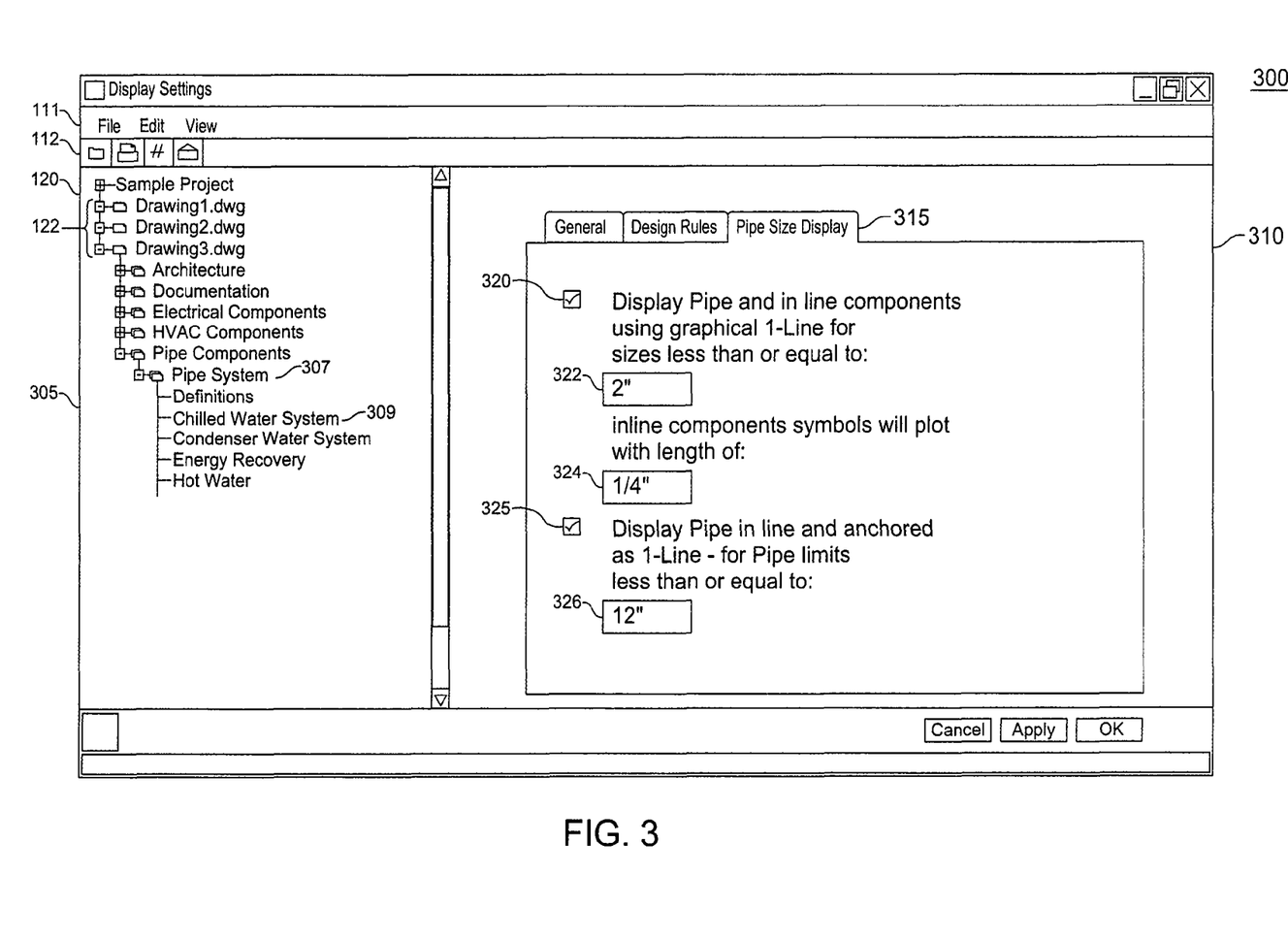
FIG. 3 is an exemplary screenshot illustrating an interface for specifying the display settings of a CAD drawing, according to one embodiment of the invention.

FIG. 3 is an exemplary screenshot illustrating an interface 300 for specifying the display settings of a CAD drawing, according to one embodiment of the invention. Referring back to FIG. 1, display settings 124 allow the user to specify how CAD application 105 selects a display representation to use in generating a rendering the components included in a particular drawing 122. As shown, interface 300 includes elements of GUI interface 110 including menu bar 111 and button bar 112. Additionally, interface 300 includes panels 305 and 310.

Panel 305 displays a hierarchy of elements associated with CAD project 120, including drawings 122. As shown, the "chilled water system" defined as a pipe system in "drawing3.dwg" is highlighted, and the attributes for the pipe system are shown in panel 310. Panel 310 displays a tabbed interface that includes a general preferences tab, a design rules tab, and a pipe size display tab 315. The elements of pipe size display tab 315 allow the user to define how CAD application 105 selects a display representation to use in generating a rendering of drawing 122.

Illustratively, pipe-size display tab 315 includes a checkbox 320 that allows the user to specify that pipe components 132 with a diameter less than a size setting 322 should be displayed using graphical 1-line display representations. As shown, size setting 322 is set to 2". Setting 324 allows the user to specify the size of symbols used to display inline components such as valves, inlets, and the like using a graphical 1-line display representation. In this example, inline components rendered using a graphical 1-line display representation are displayed using a length of ¼", regardless of the actual size of the component 132 or the scaled size of drawing 122.

Check box 325 allows the user to specify that pipe components 132 in drawing 122 with a diameter less than size setting 326 should be displayed using a 1-line display representation. As shown, size setting 326 is set to 12". This set-up leaves pipe components in drawing 122 with a diameter greater than 12" to be rendered using a full 2-line display representation.

Figure 4A:
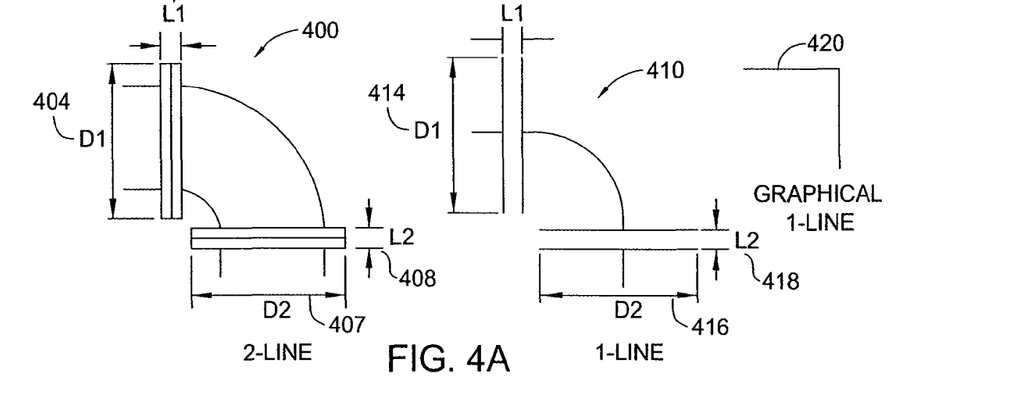
FIGS. 4A-4C each illustrate a 2-line, a 1-line, and a graphical 1-line display representation of components used in a model of a pipe system, according to one embodiment of the invention.
Figure 4B:
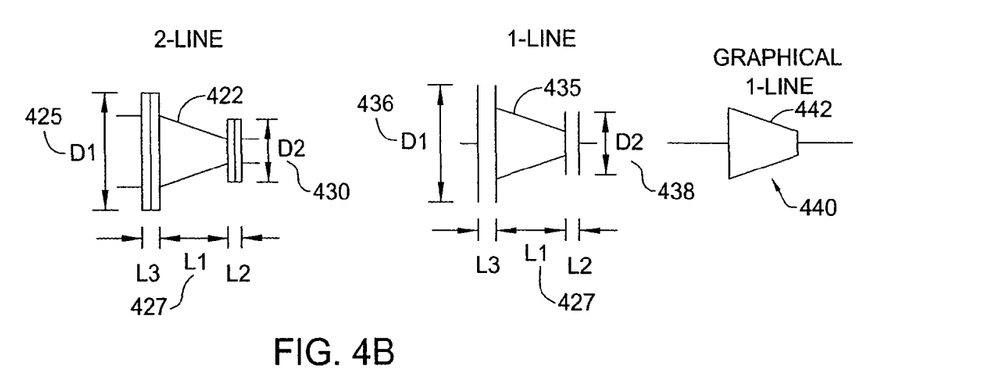
Figure 4C:
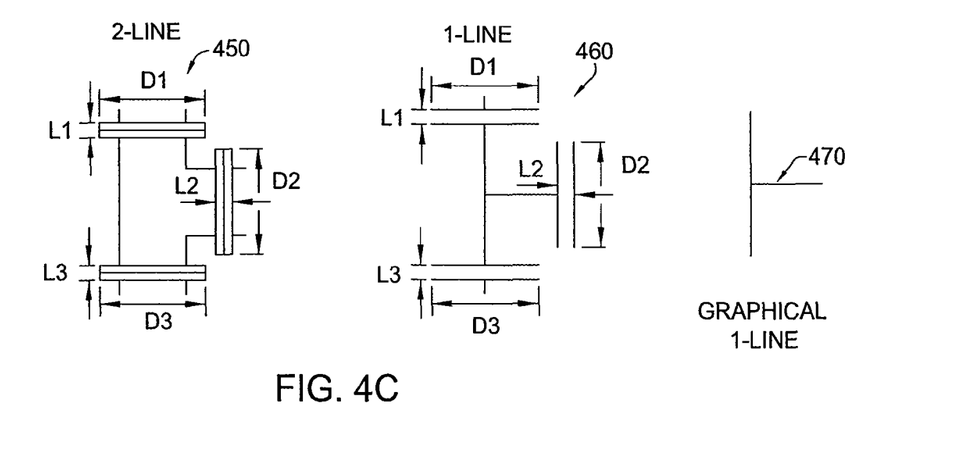

FIGS. 4A-4C each illustrate a 2-line, a 1-line, and a graphical 1-line display representation of component used in a pipe system, according to one embodiment of the invention. FIG. 4A illustrates a 2-line display representation 400 of a pipe elbow. 2-line display representation 400 shows the actual length of the connections 402 and 408 at either end of the pipe elbow, and diameters 404 and 407 reflect the actual dimensions of the elbow diameters. Importantly, 2-line display representation 400 shows the physical shape and dimensions of the pipe elbow. FIG. 4A also illustrates a 1-line display representation 410 of the pipe elbow that shows the actual dimensions of the elbow, but elements of the physical shape of the pipe elbow are omitted. Thus, diameters 414 and 418 and the actual length of connections 412 and 416 reflect the actual size of the pipe elbow, but the physical shape is shown, end to end, using only a single line. Finally, the graphical 1-line representation 420 removes all information related to the physical dimensions or size of the pipe elbow, and instead provides nothing more than a general indication of the shape of the elbow as being a 90° bend.

FIG. 4B illustrates a 2-line display representation 422 a pipe reducer used to change the diameter of a pipe run. As shown, 2-line display representation 422 includes an inlet diameter 425, an outlet diameter 430, and end-to-end length segments 427. The size and physical shape of the 2-line display representation 422 reflect the actual physical shape and dimensions of the pipe reducer. FIG. 4B also illustrates a 1-line display representation 435 of the pipe reducer. As shown, the 1-line display representation 435 includes an inlet diameter 436, an outlet diameter 438 and end-to-end length segments 427. Importantly, the physical shape of the pipe reducer, however, is not reflected in 1-line display representation 435. Finally, FIG. 4B also illustrates a graphical 1-line display representation 440 that includes a symbol 442 used to indicate in a drawing 122 that the component 132 represents a reducer. The CAD application 105 renders a display of symbol 442 at a size specified by display settings 124, regardless of the physical size of the pipe reducer or the scale of the drawing 122.

Lastly, FIG. 4C illustrates a 2-line display representation 450 for a tee shaped pipe. Like the display representations 400 and 422 illustrated in FIGS. 4A and 4B, 2-line display representation 450 illustrates both the actual dimensions and physical shape of the tee shaped pipe. Similarly, the 1-line display representation 460 shows the dimensions of the end-to-end lengths of the tee shaped pipe, as well as the diameter at each opening, but does not show the physical shape of the tee shaped pipe. The graphical 1-line display representation 470 of the tee shaped pipe shows only the general shape of the pipe and does not provide either the end-to-end dimensions or the actual physical shape of the pipe.

Figure 5:
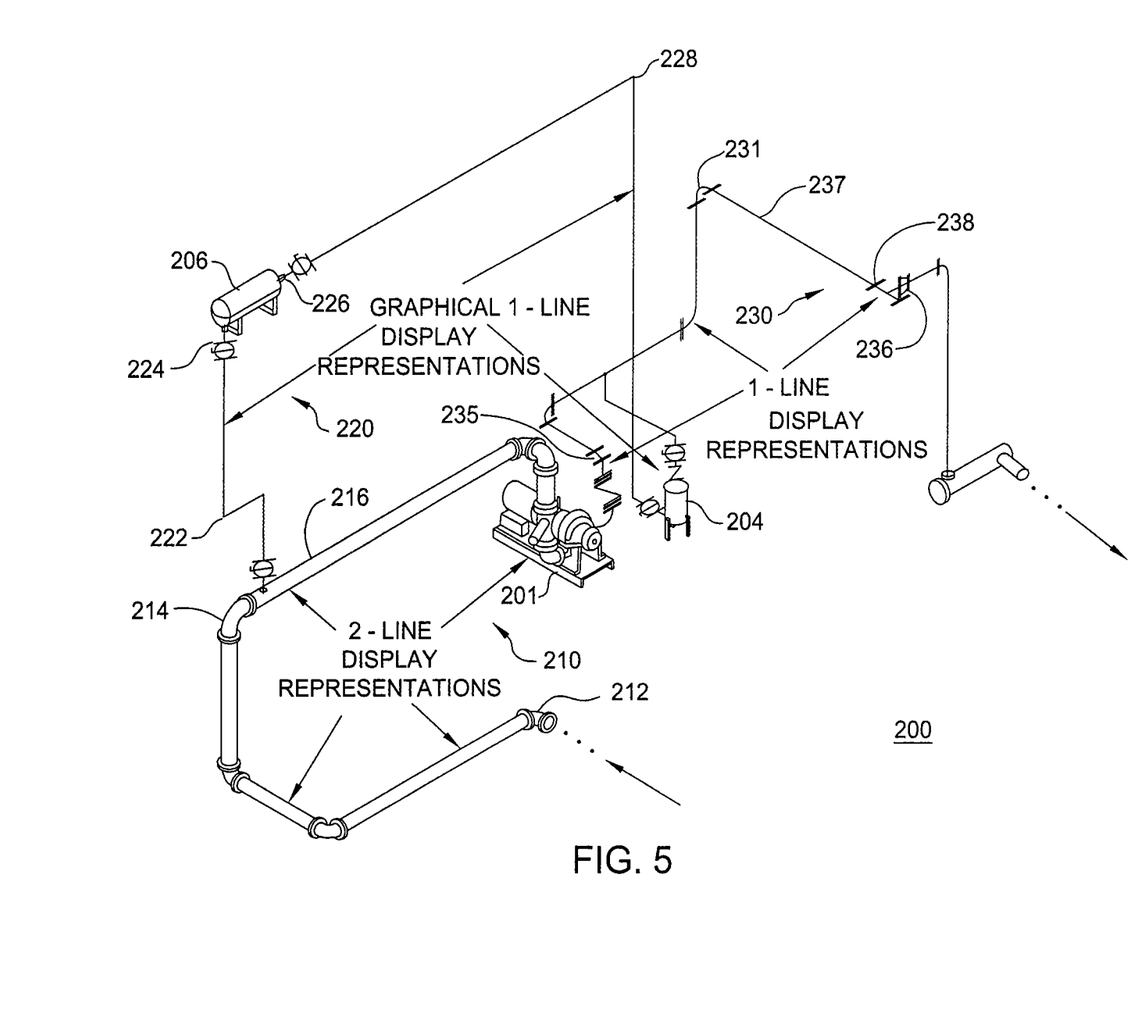
FIG. 5 is an isometric view of the pipe system of FIG. 2, rendered using the display settings for 2-line, 1-line, and graphical 1-line display representations, according to one embodiment of the invention.

FIG. 5 is isometric view of the pipe system 200, rendered using the display settings for 2-line, 1-line, and graphical 1-line display representations, according to one embodiment of the invention. As shown, the pipe runs 210, 220 and 230 are rendered components included in the pipe system 200 and the display settings illustrated in FIG. 3.

First, similar to FIG. 2, pipe run 210 is rendered using 2-line display representations as pipe run 210 represents 13" diameter pipe components 132. The display representations used to render pipe segment 212, elbow 214 and pipe segment 216 show the physical shape and dimensions of these components in the CAD drawing and are rendered to scale, relative to one another. Additionally, 2-line display representations are used to render the various pieces of equipment connected to pipe runs 210, 220 and 230. As the precise shape, size, and position of equipment may be important during installation of pipe system 200, these components are rendered using full 2-line displays.

In contrast to FIG. 2, the display representations used to render pipe run 230 are shown using 1-line display representations. For example, pipe elbow 235, pipe tee 238 and pipe reducer 236 are shown using the 1-line display representations 410, 435 and 460, respectively. 1-line display representations 410, 435 and 460 are rendered according to the scale of the drawing based on the end-to-end dimensions and positions of these components. Components of pipe run 230 rendered using 1-line display representations are shown using a single line to indicate the position of pipe run 230 without showing the actual physical shape of the particular components. For example, pipe 237 is rendered as a single line between pipe elbow 231 and tee 238. This single line represents the correct end-to-end dimensions for pipe 237.

In further contrast to FIG. 2, display representations used to display pipe run 220 are shown using graphical 1-line display representations. Thus, components in pipe run 220 such as pipe elbows 228 and 222 convey the general routing of pipe run 220, without showing the detailed size shape or physical dimensions of these components. At the same time pipe valves 224 and 226, are rendered at the size specified by display setting 324. Therefore, unlike the 2-line rendering of pipe valves 224 and 226 shown in FIG. 2, the presence and general location of these components is clearly shown, allowing the precise size and position of the physical components used to install pipe run 230 to be determined during installation.

In one embodiment, when a pipe includes has an inline component (e.g., a valve) that is displayed using a graphical 1-line symbol, the symbol may be positioned based on the center point of the in-line component. That is, even though the graphical 1-line component is not displayed at the scaled size of other elements in the drawing, the graphical 1-line component may be displayed in the correct position (i.e., the position of the in-line component relative to the rest of the pipe system). Accordingly, in one embodiment, graphical 1-line symbols are positioned based on the center point of the actual position of the in-line component, and scaled up to the plot size specified in display settings 124. However, if the plot size of the graphical 1-line symbol interferes with the display of other, to-scale, components in the CAD drawing, then the symbol may be displaced to prevent elements in the CAD drawing from overlapping with one another.

Figure 6:
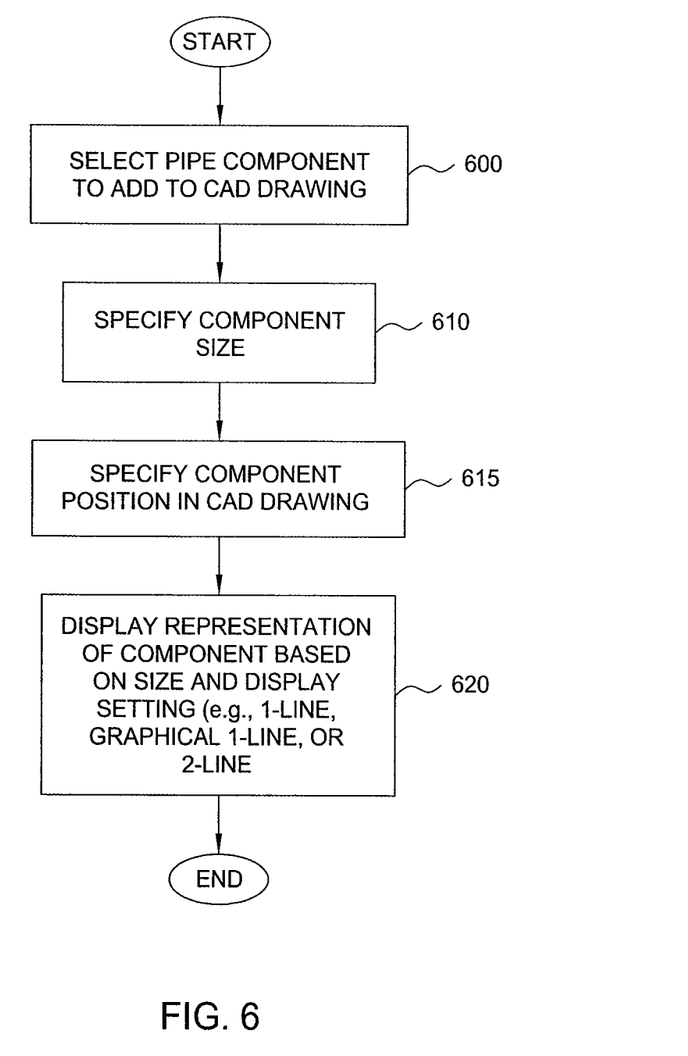
FIG. 6 is a flow diagram illustrating a method for composing a CAD drawing, according to one embodiment of the invention.

FIG. 6 is a flow diagram illustrating a method 600 for composing a CAD drawing, according to one embodiment of the invention. Persons skilled in the art will understand that any system configured to perform the method steps illustrated in FIG. 6, in any order, is within the scope of the present invention.

The method begins at step 600 where the user selects a particular component to add to a CAD drawing. At step 610, the user specifies the size of the particular component to add to the CAD drawing. For example, elements of a pipe system such as pipe segments, tees, elbows, reducers, etc., may be available in a variety of sizes, based on the diameter of the element. Additionally, if the CAD drawing includes multiple pipe systems, the user may specify which system a new component should be associated with. At step 615, the user specifies the position of the new component in the CAD drawing. At step 620, the CAD application 105 may be configured to select a display representation to use in rendering the component being added to the CAD drawing.

Figure 7:
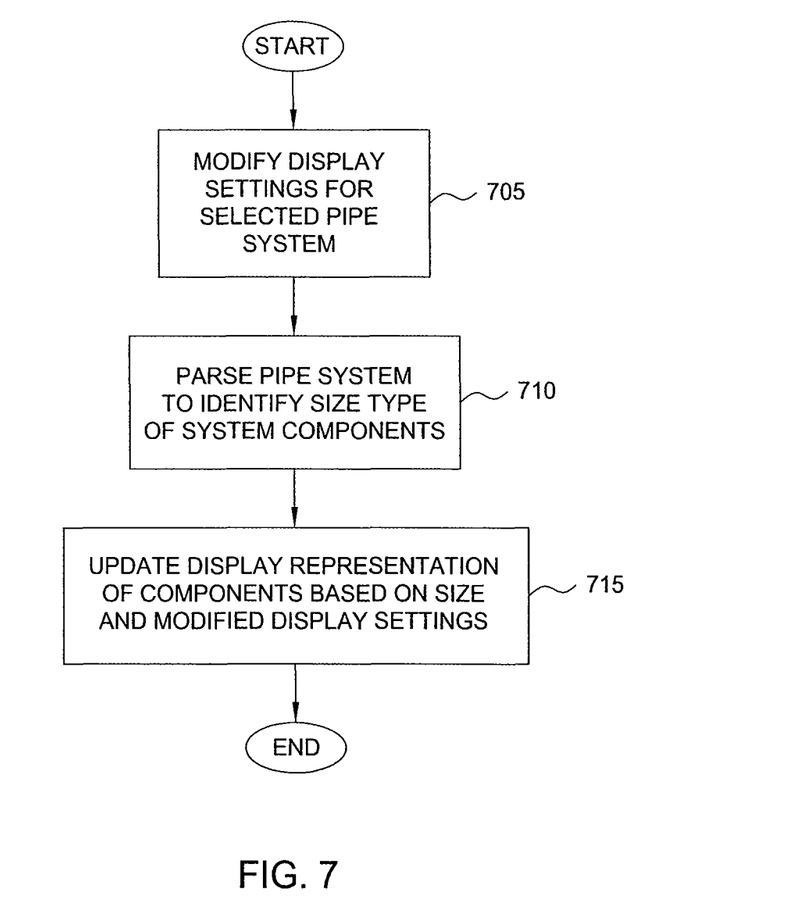
FIG. 7 is a flow diagram illustrating a method for rendering a CAD drawing using display settings to select line, and graphical 1-line display representations for components in the CAD drawing, according to one embodiment of the invention.

FIG. 7 is a flow diagram illustrating a method for rendering a CAD drawing 122 using display settings to select 1-line, 2-line, and graphical 1-line display representations of the components in the CAD drawing, according to one embodiment of the invention. Persons skilled in the art will understand that any system configured to perform the method steps illustrated in FIG. 7, in any order, is within the scope of the present invention.

The method begins at step 705 where the user modifies or defines elements of the display settings. For example, the display settings illustrated in FIG. 3 specify how components should be rendered in a drawing 122, based on the size of a given component. In another case, the display settings may depend upon which system a particular component is associated with. Once the user completes defining or modifying modifications the display settings, at step 710, the CAD application 105 may be configured to parse the systems included in the CAD drawings and determine the size of each of components included therein. At step 715, based on the size of the individual components, the CAD application 105 selects a display representation 134 to use in displaying the component. For example, as described herein, CAD application 105 may select from a 2-line, 1-line, or graphical 1-line display representation.

In addition to modifications to display settings, the display representation in a CAD drawing used for a component may be changed based on a modification to the particular component. For example, the user may change the diameter of a pipe segment included in a pipe system, and in response, the CAD application 105 may select the appropriate display representation used to render pipe segment, based on the change in diameter based on display settings specified for CAD drawing.

As described herein, CAD application 105 selects display representations used to render components included in a CAD drawing. In one embodiment, the display representations may include 2-line, 1-line, and graphical 1-line display representations. 2-line representations are used to convey the actual physical size, shape, geometry, and position of a particular component in drawing. 1-line representations are used to convey the end-to-end dimensions and size of a particular component, but do not convey the actual physical shape of the component. Graphical 1-line representations are used to convey a generalized routing of a system without including specific details about the location, fittings, or joints of the component. Additionally, for graphical 1-line representations, valves and other inline components may be represented using symbols displayed at an easily readable size.

While the foregoing is directed to embodiments of the present invention, other and further embodiments of the invention may be devised without departing from the basic scope thereof, and the scope thereof is determined by the claims that follow.

What is claimed is:

1. A method for generating a computer-aided design (CAD) drawing of a utility network performed by a computer system programmed to generate the CAD drawing by executing a CAD application, the method comprising:
    receiving, from a user-input device, a command to add a component to the CAD drawing, wherein a representation of the CAD drawing is displayed in a graphical user interface (GUI) of the CAD application executing on the computer system;
    selecting, by the CAD application without requiring a user to redraft the CAD drawing, a first display representation to use in rendering a display of the component when a size associated with the component is greater than a user-specified size setting;
    selecting, by the CAD application without requiring the user to redraft the CAD drawing, a second display representation to use in rendering the display of the component when the size associated with the component is less than the user-specified size setting;
    parsing, by the CAD application, the CAD drawing to determine that the size associated with the component is greater than the user-specified size setting;
    displaying, by the CAD application, the component on a display screen using the first display representation;
    receiving a modification that modifies either the user-specified size setting or the size associated with the component;
    in response to receiving the modification, parsing, by the CAD application, the CAD drawing to determine that the size associated with the component is less than the user-specified size setting; and
    displaying, by the CAD application, the component on the display screen using the second display representation.

2. The method of claim 1, wherein the first display representation is a 2-line representation and conveys an actual physical size, shape, and position of the component, according to a scaled size specified for the CAD drawing.

3. The method of claim 1, wherein the second display representation is a 1-line representation and conveys an end-to-end size and a physical shape of the component using a single line.

4. The method of claim 1, wherein the second display representation is a graphical 1-line representation and conveys a generalized routing and position of the component in the CAD drawing.

5. The method of claim 4, wherein the graphical 1-line representations further conveys a representation of an inline element of the component, rendered at a user-specified size.

6. The method of claim 1, wherein the utility network comprises a pipe network, electrical network, communications network, or HVAC network.

7. The method of claim 1, wherein the size associated with the component is a diameter of the component.

8. A computer-readable storage medium, excluding a signal bearing medium, storing instructions for generating a computer-aided design (CAD) drawing of a utility network, including the steps of:
    receiving, from a user-input device, a command to add a component to the CAD drawing, wherein a representation of the CAD drawing is displayed in a graphical user interface (GUI) of a CAD application executing on a computer system;
    selecting, by the CAD application without requiring a user to redraft the CAD drawing, a first display representation to use in rendering a display of the component when a size associated with the component is greater than a user-specified size setting;
    selecting, by the CAD application without requiring a user to redraft the CAD drawing, a second display representation to use in rendering the display of the component when the size associated with the component is less than the user-specified size setting;
    parsing, by the CAD application, the CAD drawing to determine that the size associated with the component is greater than the user-specified size setting;
    displaying, by the CAD application, the component on a display screen using the first display representation;
    receiving a modification that modifies either the user-specified size setting or the size associated with the component;
    in response to receiving the modification, parsing, by the CAD application, the CAD drawing to determine that the size associated with the component is less than the user-specified size setting; and
    displaying, by the CAD application, the component on the display screen using the second display representation.

9. The computer-readable storage medium of claim 8, wherein the first display representation is a 2-line representation and conveys an actual physical size, shape, and position of the component, according to a scaled size specified for the CAD drawing.

10. The computer-readable storage medium of claim 8, wherein the second display representation is a 1-line representation and conveys an end-to-end size and a physical shape of the component using a single line.

11. The computer-readable storage medium of claim 8, wherein the second display representation is a graphical 1-line representation and conveys a generalized routing and position of the component in the CAD drawing.

12. The computer-readable storage medium of claim 11, wherein the graphical 1-line representations further conveys a representation of an inline element of the component, rendered at a user-specified size.

13. The computer-readable storage medium of claim 8, wherein the utility network comprises a pipe network, electrical network, communications network, or HVAC network.

14. The computer-readable storage medium of claim 8, wherein the size associated with the component is a diameter of the component.

15. A computing device comprising:
    a processing unit; and
    a memory that includes instructions which, when executed by the processing unit, cause the processing unit to perform operations for generating a computer-aided design (CAD) drawing of a utility network, including the steps of:
        receiving from a user-input device a command to add a component to the CAD drawing;
        selecting without requiring a user to redraft the CAD drawing a first display representation to use in rendering a display of the component when a size associated with the component is greater than a user-specified size setting;
        selecting without requiring a user to redraft the CAD drawing a second display representation to use in rendering the display of the component when the size associated with the component is less than the user-specified size setting;

parsing the CAD drawing to determine that the size associated with the component is greater than the user-specified size setting;

displaying the component on a display screen using the first display representation;

receiving a modification that modifies either the user-specified size setting or the size associated with the component;

in response to receiving the modification, parsing the CAD drawing to determine that the size associated with the component is less than the user-specified size setting; and displaying the component on the display screen using the second display representation.

16. The computing device of claim 15, wherein the first display representation is a 2-line representation and conveys an actual physical size, shape, and position of the component, according to a scaled size specified for the CAD drawing.

17. The computing device of claim 15, wherein the second display representation is a 1-line representation and conveys an end-to-end size and a physical shape of the component using a single line.

18. The computing device of claim 15, wherein the second display representation is a graphical 1-line representation and conveys a generalized routing and position of the component in the CAD drawing.

19. The computing device of claim 18, wherein the graphical 1-line representations further conveys a representation of an inline element of the component, rendered at a user-specified size.

20. The computing device of claim 15, wherein the utility network comprises a pipe network, electrical network, communications network, or HVAC network.

21. The computing device of claim 15, wherein the size associated with the component is a diameter of the component.

* * * * *